US008644026B2

(12) United States Patent
Park

(10) Patent No.: US 8,644,026 B2
(45) Date of Patent: Feb. 4, 2014

(54) PORTABLE TERMINAL

(75) Inventor: Youngin Park, Suwon (KR)

(73) Assignee: LG Electronics Inc., Seoul (KR)

( * ) Notice: Subject to any disclaimer, the term of this patent is extended or adjusted under 35 U.S.C. 154(b) by 317 days.

(21) Appl. No.: 12/860,321

(22) Filed: Aug. 20, 2010

(65) Prior Publication Data

US 2011/0051380 A1     Mar. 3, 2011

(30) Foreign Application Priority Data

Aug. 27, 2009   (KR) .................. 10-2009-0079960

(51) Int. Cl.
*H05K 5/00*     (2006.01)
*H05K 7/00*     (2006.01)
*H05K 1/00*     (2006.01)
*H04M 1/00*     (2006.01)

(52) U.S. Cl.
USPC ........... 361/749; 361/679.26; 361/679.29; 361/679.3; 361/752; 455/575.3; 455/575.4

(58) Field of Classification Search
USPC ............ 361/679.01, 679.02, 679.08, 679.09, 361/679.3, 679.55–679.59, 749–759; 455/325, 556.1, 550.1, 90.1, 575.1; 345/156, 157, 168, 169, 184
See application file for complete search history.

(56) References Cited

U.S. PATENT DOCUMENTS

| | | | |
|---|---|---|---|
| 2003/0081375 A1 | 5/2003 | Yamamoto | 361/681 |
| 2005/0133327 A1* | 6/2005 | Kao et al. | 191/12 R |
| 2008/0278753 A1* | 11/2008 | Oda et al. | 358/1.15 |
| 2008/0297991 A1 | 12/2008 | Ou | 361/679 |
| 2009/0021899 A1 | 1/2009 | Chen | 361/680 |
| 2009/0029741 A1* | 1/2009 | Satou et al. | 455/566 |
| 2010/0151924 A1* | 6/2010 | Amano | 455/575.4 |

FOREIGN PATENT DOCUMENTS

| | | |
|---|---|---|
| CN | 1416255 | 5/2003 |
| CN | 101351099 | 1/2009 |

OTHER PUBLICATIONS

European Search Report dated Dec. 15, 2010 issued in Application No. 10 00 8574.
Chinese Office Action dated Feb. 4, 2013 for Application 201010265579.6 and English translation.

* cited by examiner

*Primary Examiner* — Jayprakash N Gandhi
*Assistant Examiner* — Jerry Wu
(74) *Attorney, Agent, or Firm* — KED & Associates LLP

(57) ABSTRACT

A portable terminal comprise a lower body, an upper body disposed to overlap the lower body, and formed to be in an open configuration which exposes a part of an upper surface of the lower body, and a closed configuration which covers the one part by a sliding motion, a flexible printed circuit board (FPCB) having one end connected to the lower body and another end connected to the upper body, and formed to be bent as the upper body moves with respect to the lower body, and an FPCB retention unit configured to elastically move one or more bent portions of the FPCB into an accommodation space formed in the upper body when the upper body moves from a closed configuration to an open configuration.

18 Claims, 8 Drawing Sheets

PORTABLE TERMINAL

CROSS-REFERENCE TO A RELATED APPLICATION

Pursuant to 35 U.S.C. §119(a), this application claims the benefit of earlier filing date and right of priority to Korean Application 10-2009-0079960, filed on Aug. 27, 2009, the content of which is incorporated by reference herein in its entirety.

BACKGROUND OF THE INVENTION

1. Field of the Invention

The present invention relates to a portable terminal, and particularly, to a portable terminal configured to be open and closed in a sliding manner.

2. Background of the Invention

A portable terminal is a device that can be carried around and has one or more functions such as voice and video call communication, inputting and outputting information, storing data, and the like.

As such functions become more diversified, the portable terminal can support more complicated functions such as capturing images or video, reproducing music or video files, playing games, receiving broadcast signals, and the like. By comprehensively and collectively implementing such functions, the portable terminal may be embodied in the form of a multimedia player or device.

In order to implement various functions of such multimedia players or devices, the multimedia player requires sufficient support in terms of hardware or software, for which numerous attempts are being made and implemented. For example, a user interface allowing users to easily and conveniently search for and select one or more functions is provided.

As the portable terminal is considered as a personal belonging, form factors are variously implemented so that selections according to each personality can be facilitated. The portable terminal has various types such as a bar type in which an input unit, an output unit, and a display unit are disposed on one body, a folder type in which one body is rotated to be open or closed with respect to another body, a swing type, and a slide type in which one body is performs a sliding motion with respect to another body thus to be open or closed.

Among these various types, the slide type is being spotlighted due to a simple opening operation, and a characteristic that a display unit is easily recognized by being always exposed to outside of the portable terminal. However, when increasing a sliding distance (stroke) in the slide type portable terminal, a flexible printed circuit board (FPCB), a means for electrically connecting two bodies to each other may be exposed to outside.

SUMMARY OF THE INVENTION

Therefore, an object of the present invention is to provide a portable terminal capable of utilizing a wide user interface region by opening and closing one body in a sliding manner with respect to another body, capable of preventing a flexible printed circuit board (FPCB) from being exposed to outside when implementing a long stroke, and capable of having an enhanced appearance.

To achieve these and other advantages and in accordance with the purpose of the present invention, as embodied and broadly described herein, there is provided a portable terminal, comprising: a lower body; an upper body disposed to overlap the lower body, and formed to be in an open configuration which exposes a part of an upper surface of the lower body, and a closed configuration which covers the one part by a sliding motion; a flexible printed circuit board (FPCB) having one end connected to the lower body and another end connected to the upper body, and formed to be bent as the upper body moves with respect to the lower body; and an FPCB retention unit configured to elastically move one or more bent portions of the FPCB into an accommodation space formed in the upper body when the upper body moves from a closed configuration to an open configuration.

The FPCB retention unit may include a first holder fixed to an inner side of the upper body; a second holder movably mounted to the accommodation space of the upper body, and configured to pull the bent portion; and a spring supported between the first and second holders, and configured to restore the second holder to a direction approaching to the first holder when the closed configuration is converted into the open configuration.

The portable terminal may further comprise a guide unit configured to guide the second holder to linearly move with pulling the bent portion.

The guide unit may include a rail formed along a moving direction of the second holder; and a sliding hanger having one end connected to the second holder, and another end which allows the FPCB to be hung, and configured to perform a sliding motion along the rail.

The sliding hanger may be formed by bending a pin or a rod formed of metallic material. In this case, the rail may be formed in one pair, and both ends of the sliding rail may be configured to move with contacting the one pair of rails.

The sliding hanger may further comprise a first rolling unit configured to roll-contact the bent portion.

The first rolling unit may include a first roller rotatably mounted to the sliding hanger, and a first revolver formed on an outer circumferential surface of the first roller so as to roll-contact the bent portion of the FPCB. The first revolver may be formed of elastomer which can be elastically transformed. And, the spring may be implemented as a tensile coil spring.

The FPCB may further include a reverse bent portion bent in an opposite direction to the bent portion, and the reverse bent portion may be configured to contact a second rolling unit rotated by being fixed to the upper body.

The portable terminal may further comprise a slide module configured to elastically guide the upper body when the upper body moves to an open or closed configuration.

The slide module may include a first slide member fixed to the lower body; a second slide member fixed to the upper body, and formed at the first slide member so as to perform a sliding motion; and an elastic module disposed between the first and second slide members, and configured to store an elastic force therein while the second slide member performs a sliding motion by a predetermined distance, and to move the second slide member with using the stored elastic energy when the second slide member moves by a distance more than the predetermined distance.

The upper body may be configured to perform a sliding motion in a width direction. And, a 'qwerty' type of key pad may be installed at the lower body.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
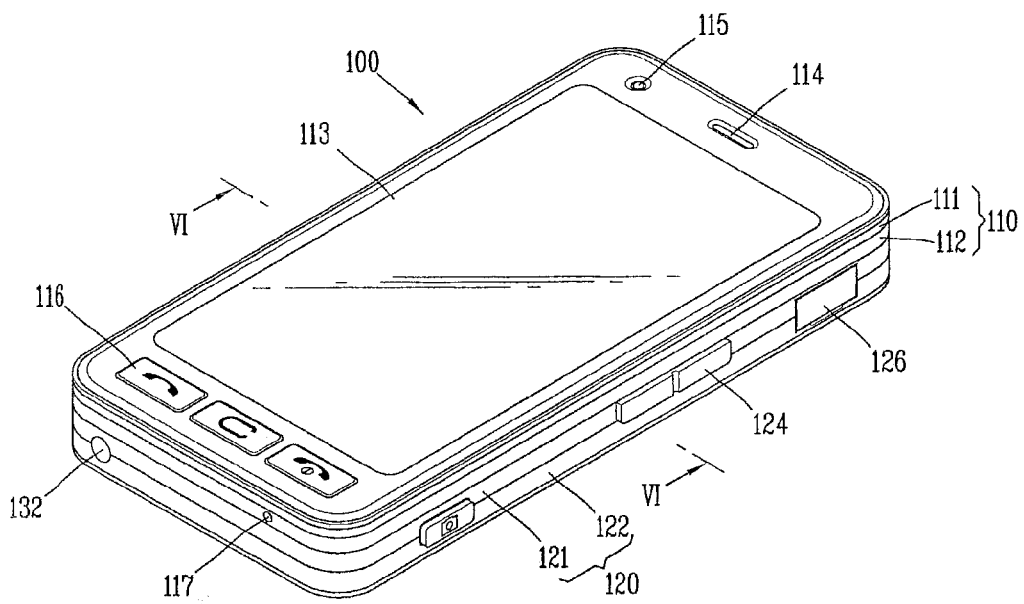
FIG. 1 is a perspective view showing a closed configuration of a portable terminal according to one embodiment of the present invention.

Description will now be given in detail of the present invention, with reference to the accompanying drawings.

For the sake of brief description with reference to the drawings, the same or equivalent components will be provided with the same reference numbers, and description thereof will not be repeated.

The portable terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

Hereinafter, a portable terminal according to the present invention will be explained in more detail with reference to the attached drawings. The same configurations as those of the aforementioned embodiment will be provided with the same reference numerals, and their detailed explanations will be omitted.

Figure 2:
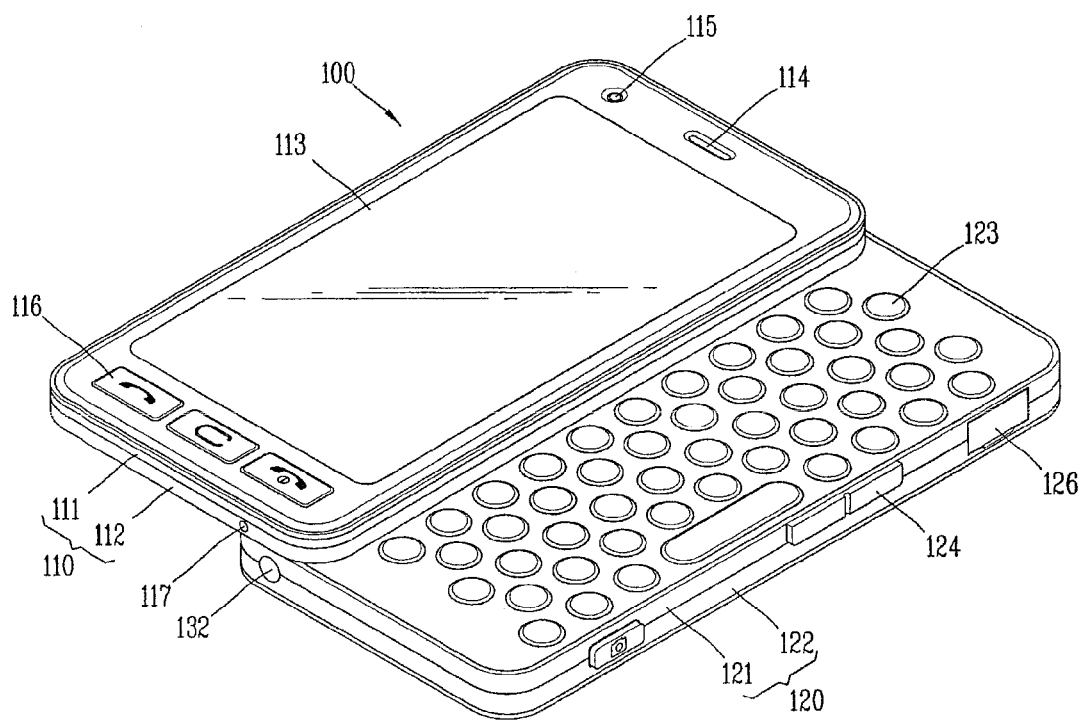
FIG. 2 is a perspective view showing an open configuration of the portable terminal of FIG. 1.

FIGS. 1 and 2 are perspective views of a portable terminal according to the present invention, in which FIG. 1 shows a closed configuration of the portable terminal and FIG. 2 shows an open configuration of the portable terminal.

As shown in FIGS. 1 and 2, the portable terminal 100 includes an upper body 110 and a lower body 120 coupled to each other so as to be movable with respect to each other. The portable terminal 100 shown in FIGS. 1 and 2 is open by a sliding motion in a width direction (horizontal direction). However, the portable terminal 100 may be configured to be open by a sliding motion in a length direction (vertical direction).

As shown in FIG. 1, a state that the upper body 110 overlaps the lower body 120 may be referred to as a 'closed configuration'. As shown in FIG. 2, a state that the upper body 110 is moved in one direction thus to expose at least one part of the lower body 120 may be referred to as an 'open configuration. In the preferred embodiment, the upper body 110 and the lower body 120 perform a sliding motion with respect to a base 130. However, the present invention is not limited to this. For instance, one of the upper body 110 and the lower body 120 may be configured to swing or swivel with respect to the other.

Typically, the portable terminal 100 functions in a standby mode when in the closed configuration, but the standby mode may be released by a user's manipulation. Also, the portable terminal functions in a call mode, etc. when in the opened configuration. Here, the call mode, etc. may be converted into a standby mode according to a user's manipulation or time lapse.

Various components may be arranged on upper surfaces of the upper body 110 and the lower body 120 according to a function implemented by the portable terminal 100 with emphasis, or according to a type of a user interface. For instance, as shown in FIG. 2, a display unit 113 may be disposed on an upper surface of the upper body 110, and a second manipulation portion 123 for inputting a control command may be disposed on an upper surface of the lower body 120.

Referring to FIG. 1, a case forming the appearance of the upper body 110 (casing, housing cover, etc.) is formed by a front case 111 and a rear case 112. Each kind of electronic components are mounted in a space formed by the front case 111 and the rear case 112. If desired, one or more intermediate cases may be provided between the front case 111 and the rear case 112. The front and rear cases are usually formed by injection-molding synthetic resin, or formed with using metallic material such as stainless steel (STS) and titanium (Ti).

On the front case 111 of the upper body 110, may be arranged a display unit 113, an audio output unit 114, a first image input unit 115, a first manipulation unit 116, and an audio input unit 117.

The display unit 113 includes a display module for visually displaying information such as a liquid crystal displays (LCD) module, an organic light emitting diodes (OLED) module, and a transparent OLED (TOLED) module.

The display unit 113 further comprises a touch screen to allow information to be inputted by a user's touch. Number keys that can be inputted in a touch manner may be outputted to the display unit 113.

The display unit 113 may be formed to generated various tactile effects recognized by a user when being touched. This may be implemented by a haptic module interworking with the display unit 113. A representative tactile effect generated by the haptic module is vibration. The haptic module may be variously arranged according to a configuration aspect of not only the display unit 113 but also the portable terminal 100.

The audio output unit 114 may be implemented in the form of a receiver or a speaker. The first image input unit 115 may be implemented as a camera module for capturing a still image or a moving image of a user, etc. The first manipulation unit 116 receives a command for controlling the operation of the portable terminal according to one embodiment of the present invention. The audio input unit 117 may be implemented in the form of a microphone, and may be arranged to be symmetric to the audio output unit 114 based on the display unit 113.

Like the upper body 110, the lower body 120 may include a front case 121 and a rear case 122. A second manipulation unit 123 (refer to FIG. 2) may be disposed on a front surface of the front case 121 of the lower body 120.

A broadcast signal receiving antenna 132 as well as an antenna for calling may be disposed at one side of the lower body 120. The antenna 132 may be installed so as to be withdrawn from the lower body 120.

Referring to FIG. 2, once the upper body 110 performs a sliding motion with respect to the lower body 120, the second manipulation unit 123 disposed on a front surface of the lower body 120 which overlaps the upper body 110 in a closed configuration (a state of FIG. 1) is exposed out from the upper body 110.

Keys of the exposed second manipulation unit 123 may be configured to receive inputs relating to contents outputted to the display unit 113. The second manipulation unit 123 may include number keys or character keys, and the keys may be arranged in a QWERTY manner.

If the second manipulation unit 123 is a touch screen, icons of functional keys may be outputted to an exposed part of the touch screen so as to be inputted in a touching manner. For instance, in case of outputting a moving image to the display unit 113, the functional keys may be configured to receive commands for implementing functions such as 'temporal stop', 'play', 'forward', 'backward', and 'play list'.

In the aforementioned embodiment, the second manipulation unit 123 was arranged on a front surface of the lower body 120. However, the present invention is not limited to this. For instance, an additional display unit interworking with the display unit 113 may be arranged on the front surface of the lower body 120.

Figure 3:
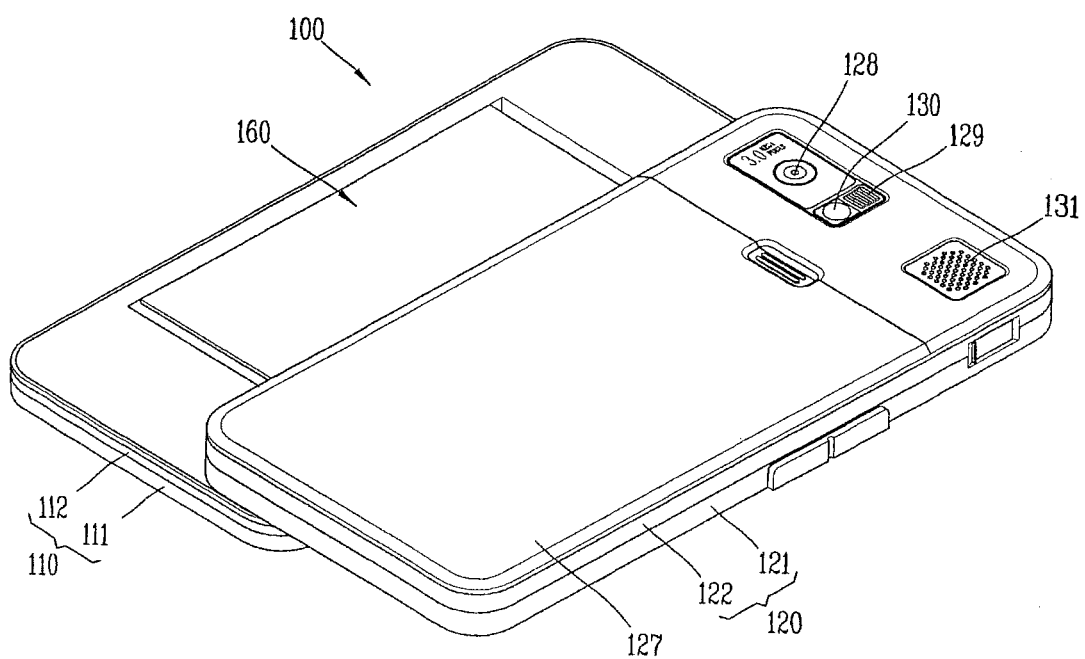
FIG. 3 is a perspective view showing a rear surface of the portable terminal of FIG. 2.

FIG. 3 is a perspective view showing a rear surface of the portable terminal 100 of FIG. 2.

Referring to FIG. 3, a third manipulation unit 124, an interface unit 126, etc. may be disposed on a side surface of the lower body 120.

The first to third manipulation units 116, 123 and 124 may be referred to as user input units, and may be implemented in any types to input information in a user's tactile manner.

For instance, the user input units may be implemented as a dome switch or a touch screen or a touch pad to input information or commands by a user's push or touch. Also, the user input units may be implemented as a jog wheel or a jog switch.

In a functional aspect, the first manipulation unit 116 may serve to input commands such as 'START', 'END', and 'SCOLL', and the second manipulation unit 123 may serve to input numbers, characters, or symbols. And, the third manipulation unit 124 may be operated as a hot key for performing a particular function such as activation of the first image input unit 115.

The interface unit 126 serves as a passage through which the portable terminal 100 of the present invention exchanges data with external devices. For instance, the interface unit 126 include wired/wireless terminals to be connected to earphones, power supplies to supply power to short-range communication ports (e.g., IrDA port, Bluetooth port, and wireless LAN port).

Also, the interface unit 126 may be implemented as a card socket (e.g., for coupling to a memory card, subscriber identity module (SIM) card, and user identity module (UIM) card).

A power supply unit 127 for supplying power to the portable terminal 100 is mounted to the lower body 120. The power supply unit 127 may be implemented as a rechargeable battery detachably coupled to the portable terminal for charging.

A second image input unit 128 may be further mounted to the rear case 122 of the lower body 120. The second image input unit 128 may be a camera having an opposite capturing direction to the first image input unit 115 (refer to FIG. 1), and having different pixels from the first image input unit.

For instance, the first image input unit 115 operates with a relatively lower resolution than the second image input unit 128. Such an arrangement works well during a video conference, for example. The relatively higher resolution of the image input unit 128 is useful for obtaining higher quality pictures for later use.

A flash 129 and a mirror 130 are arranged near the second image input unit 128. When capturing an object by the second image input unit 128, the flash 129 provides light toward the object. The mirror 130 is useful for assisting a user to position the second image input unit 128 in a self-portrait mode.

A second audio output unit 131 may be further arranged on the rear case 122.

The second audio output unit 131 may implement a stereo function together with the first audio output unit 114 (refer to FIG. 1), and may be used for calling in a speaker phone mode.

In the above embodiment, the second image input unit 128 was arranged on the rear case 122. However, the present invention is not limited to this. For instance, at least one of the components 128~131 explained to be arranged on the rear case 122 may be mounted on the rear case 112 of the upper body 110. In this case, the components arranged on the rear case 112 can be protected by the lower body 120 in a closed configuration. Also, the first image input unit 115 may be configured to be rotatably formed to capture an object which can be captured by the second image input unit 128, even if the second image input unit 128 is not additionally provided.

In order to slide the lower body 120 when the upper body 110 performs a sliding motion, the upper body 110 and the lower body 120 are connected to each other by a slide module 160 (refer to FIG. 3). The slide module 160 serves to slide the upper body 110 with respect to the lower body 120 in closed and open configurations.

If the upper body 110 is much slid, a front surface of the lower body 120 has a larger exposed area. As the exposed area becomes larger, the second manipulation unit 123 may have keys arranged with a larger size, or may have a larger number of keys.

Figure 4:
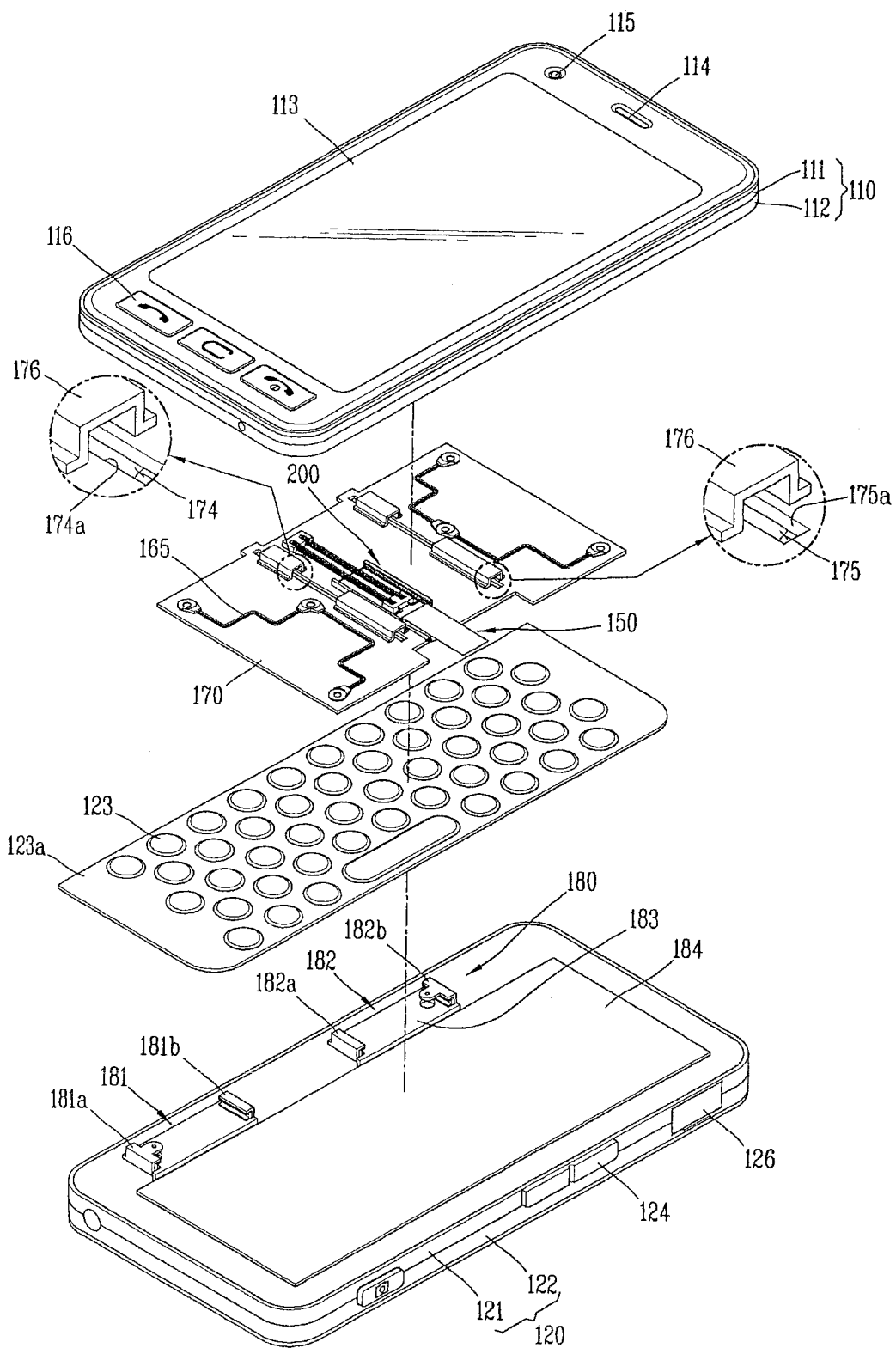
FIG. 4 is a disassembled perspective vie of the portable terminal according to one embodiment of the present invention.

FIG. 4 is a disassembled perspective view of the portable terminal according to one embodiment of the present invention.

A slide module 160 is provided between an upper body 110 and a lower body 120. The slide module 160 guides the upper body 110 to perform a sliding motion with respect to the lower body 120.

The slide module 160 may include first and second slide members 170 and 180.

Referring to FIG. 4, the first slide member 170 is mounted to the rear case 112 of the upper body 110. The first slide member 170 may be formed of a metallic material such as Stainless Steel (SUS), and may be formed in the form of a plate or a sheet.

The second slide member 180 is connected to the first slide member 170 so as to perform a relative sliding motion. The second slide member 180 may include guide rails 181a and 182b along which inserted two side surfaces of the first slide member 170 move.

The second slide member 180 may be formed on one surface of the front case 121 which forms the appearance of the lower body 120. That is, the second slide member 180 is integrally fabricated with the lower body 120 to reduce the number of components and fabrication processes, thereby reducing the fabrication costs of the portable terminal. However, the present invention is not limited to this. That is, the second slide member 180 may be coupled to one surface of the lower body 120 as an additional component.

An elastic module 165 may be provided between the first and second slide members 170 and 180. The elastic module 165 provides an elastic force so that the first and second slide members 170 and 180 can semi-automatically perform a relative sliding motion, i.e., so that the first and second slide members 170 and 180 having performed a relative sliding motion on a region more than a predetermined region can automatically perform a sliding motion after the region.

The first slide member 170 may be provided with first and second guide holes 174 and 175. The first and second guide holes 174 and 175 may be implemented as through holes penetratingly formed at the first slide member 170, and may be configured in the form of slots extending in a sliding direction of the upper and lower bodies 110 and 120.

The first slide member 170 may be further provided with a strength reinforcing unit 176 for covering the first and second guide holes 174 and 175. The strength reinforcing unit 176 is formed so that both ends thereof are protruding from a base plate 371, respectively, and a region between the two ends can cover the first and second guide holes 174 and 175. Under these configurations, peripheral strength of the first and second guide holes 174 and 175 may be reinforced.

The second slide member 180 may include a base plate 184, and first and second slide rail units 181 and 182.

The base plate 184 is formed on the front case 121 of the lower body 120, and a supporting plate 123a which supports the second manipulation unit 123 may be mounted on an upper surface of the base plate 184. The first and second slide rail units 181 and 182 are extending from one side of the base plate 184.

The first slide rail unit 181 is slidably coupled to one side surface of the first slide member 171 and the first guide hole 174. Guide rails 181a and 181b slidably coupled to one side surface of the first slide member 171 and the first guide hole 174 may be formed at the first slide rail unit 181.

The second slide rail unit 182 is slidably coupled to another side surface of the first slide member 171 and the second guide hole 175. Guide rails 182a and 182b slidably coupled to another side surface of the first slide member 171 and the second guide hole 175 may be formed at the second slide rail unit 182.

The upper and lower bodies 110 and 120 are electrically connected to each other by a flexible printed circuit board (FPCB) 150. An FPCB retention unit 200 configured to transfer the FPCB 150 when the upper and lower bodies 110 and 120 perform a relative motion with respect to each other may be formed at the first slide member 170.

Hereinafter, a detailed structure of the FPCB retention unit 200 will be explained.

Figure 5:
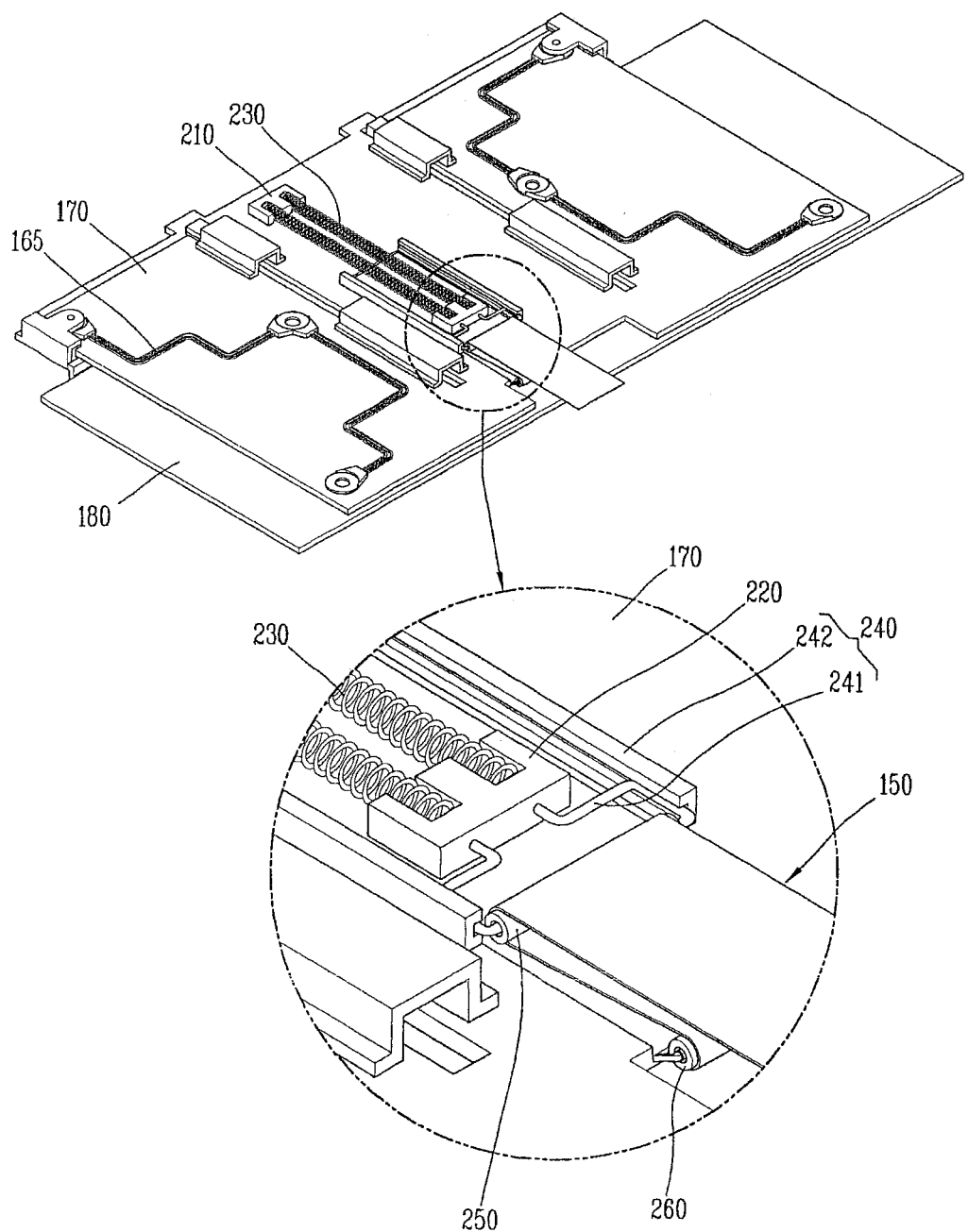
FIG. 5 is a perspective view of a slide module of FIG. 4.

FIG. 5 is a perspective view of a slide module, which shows a configuration of the FPCB retention unit 200. FIG. 5 shows the slide module in a closed configuration, and FIG. 6 is a sectional view taken along line 'VI-VI' in FIG. 1.

Figure 6:
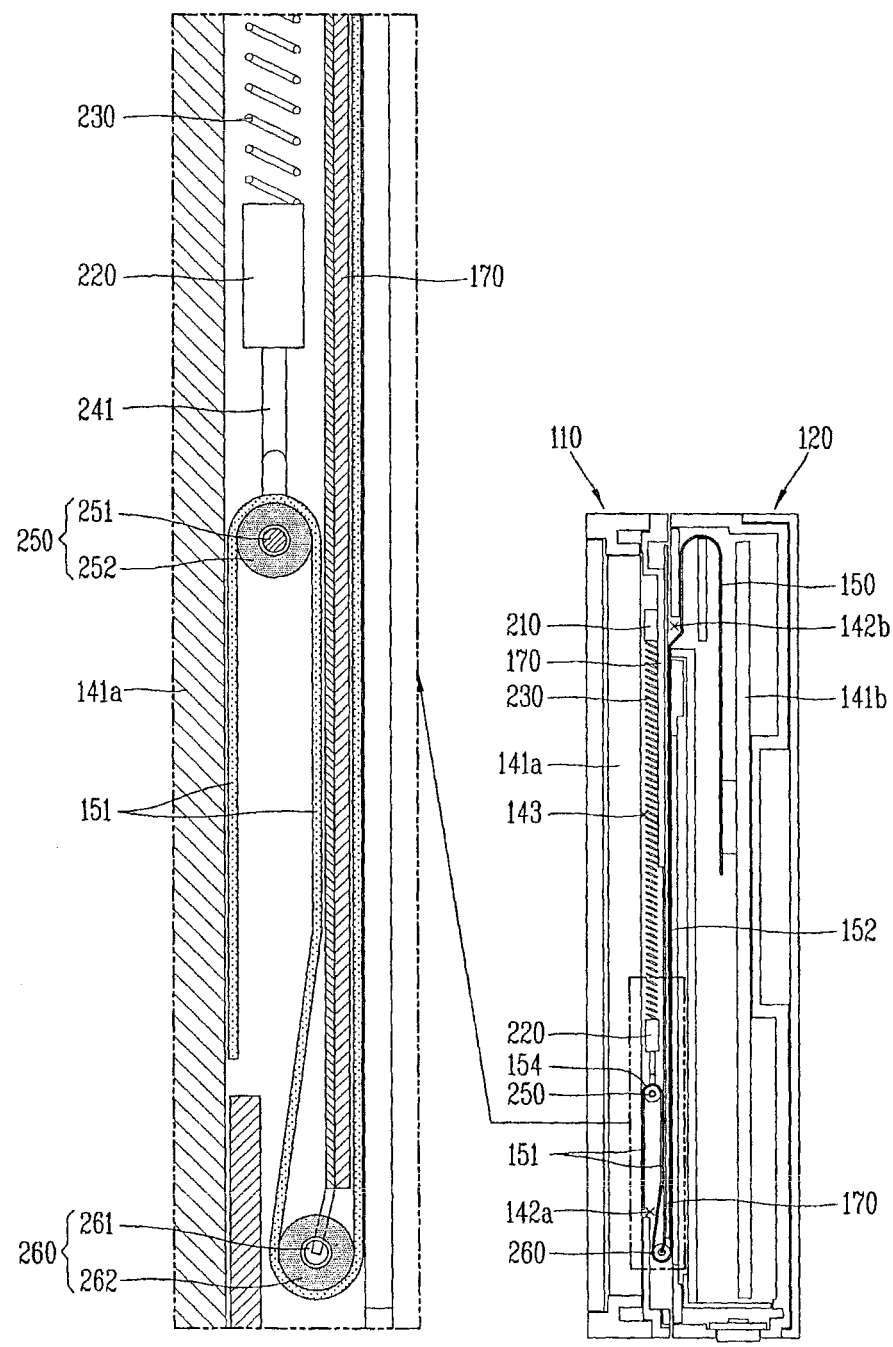
FIG. 6 is a sectional view taken along line 'VI-VI' in FIG. 1.

Referring to FIG. 6, first and second electronic components 141a and 141b are mounted in the upper and lower bodies 110 and 120, respectively. The electronic components indicate components which implement each kind of functions of the portable terminal, such as a display module, a circuit board, a camera and a printed circuit board. Referring to FIG. 6, the first electronic component 141a may be a display module, and the second electronic component 141b may be a printed circuit board.

The first and second electronic components 141a and 141b are electrically connected to each other by the FPCB 150. Accordingly, even if electronic components are mounted in the upper and lower bodies 110 and 120 separated from each other, the portable terminal may operate so that the electronic components can interwork with each other. For instance, information inputted to the second manipulation unit 123 may be displayed on the display unit 113.

The FPCB 150 is configured to penetrate first and second openings 142a and 142b formed at the upper and lower bodies 110 and 120, respectively.

The first and second openings 142a and 142b are formed so as to be near the ends of the upper and lower bodies 110 and 120 approaching to each other when the upper body 110 performs a sliding motion from a closed configuration to an open configuration. Referring to FIG. 6, the first opening 142a and the second opening 142b are disposed in directions opposite to each other. The first and second openings 142a and 142b are formed at positions covered by the lower and upper bodies 120 and 110, respectively, so as not to be exposed to outside in closed and open configurations.

The FPCB 150 is connected to the first electronic component 141a. And, the FPCB 150 includes a first part 151 having a first bent portion 154 thereon, and a second part 152 extending from the first part 151 and connected to the second electronic component 141b.

The first part 151 is connected to the first electronic component by passing through the first opening 142a, and is configured to have the first bent portion 154 thereon in an accommodation space 143 formed between the first slide member 170 and the upper body 110. Front and rear surfaces based on the first part 151 are arranged to be in parallel to a main surface of the upper body 110 (i.e., a surface where a display is arranged).

In the preferred embodiment, the accommodation space 143 is formed between the first slide member 170 and the upper body 110. However, the accommodation space 143 may be formed in the upper body 110.

The second part 152 is extending from the first part 151 thus to be connected to the second electronic component 141b. The second part 152 has a second bent portion 155 thereon thus to be extending up to the second opening 142b, and then is connected to the second electronic component 141b by passing through the second opening 142b. Here, the second bent portion 155 is bent in an opposite direction to the first bent portion 154.

When the upper body 110 is moved to an open configuration from a closed configuration, the FPCB retention unit 200 moves the first bent portion 154 toward a moving direction of the upper body 110, thereby transmitting at least one part of the second part 152 into the accommodation space 143.

Referring to FIGS. 5 and 6, the FPCB retention unit 200 may include a first holder 210, a second holder 220 and a spring 230.

The first holder 210 is fixed to the first slide member 170, and is disposed in the accommodation space 143.

The second holder 220 is configured to perform a sliding motion in the accommodation space 143, and is connected to the first bent portion 154 of the FPCB 150.

The second holder 220 may be mounted on the first slide member 170 so as to be slidably moved. For this, a guide unit 240 for guiding a slide motion of the second holder 220 may be provided between the second holder 220 and the first slide member 170.

The guide unit 240 may include a sliding hanger 241 connected to the second holder 200, and a rail 242 formed on the first slide member 170 and configured to guide movement of the sliding hanger 241 inserted thereinto.

The sliding hanger 241 may be formed by bending a metallic pin or rod, and the rail 242 is protruding from the first slide member 170 thus to accommodate therein one side of the sliding hanger 241. A first bent portion 154 of the FPCB 150 may be connected to the rail 242.

The rail 242 is implemented in the form of a guide rail having a predetermined length, and the sliding hanger 241 may be positioned at one end of the rail 242 in a closed configuration.

A first rolling unit 250 roll-contacting the first bent portion 154 of the FPCB 150 may be additionally provided at the second holder 220. In the preferred embodiment, the first rolling unit 250 is mounted to the sliding hanger 241.

The first rolling unit 250 may include a first roller 251 rotatably mounted to the sliding hanger 241, and a first revolver 252 formed on an outer circumferential surface of the first roller 251 so as to roll-contact the first bent portion 154 of the FPCB 150. The first revolver 252 may be formed of an elastic material such as elastomer. The first rolling unit 250 serves to reduce friction applied to the surface of the FPCB 150 when the FPCB 150 is transferred.

The spring 230 connects the first holder 210 and the second holder 220 to each other, and provides an elastic force to move the second holder 220 when the current state of the portable terminal is converted to an open configuration from a closed configuration. The spring 250 may be implemented in the form of a compression spring. In this case, the spring is arranged with a tensile state in a closed configuration as shown in FIG. 5. The spring generates compressive force as the current state of the portable terminal is converted to an open configuration from a closed configuration. As a result, the sliding hanger 251 performs a sliding motion toward another end of the rail 252.

A second rolling unit 260 roll-contacting the second bent portion 155 of the FPCB 150 may be further provided at the first slide member 170. The second rolling unit 260 may have a similar configuration to the first rolling unit 250. That is, the second rolling unit 260 may include a second roller 261 rotatably mounted to the first slide member 170, and a second revolver 262 formed on an outer circumferential surface of the second roller 261 so as to roll-contact the second bent portion 155 of the FPCB 150.

Hereinafter, the operation of the FPCB retention unit will be explained with reference to FIGS. 7 and 8.

Figure 7:
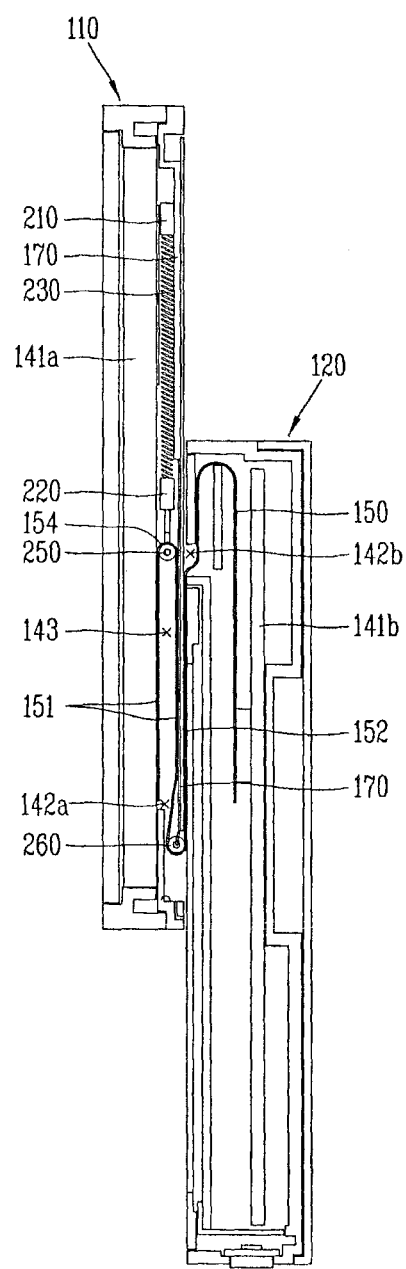
FIG. 7 is a sectional view of the portable terminal, which shows an intermediate configuration between a closed configuration and an open configuration.
Figure 8:
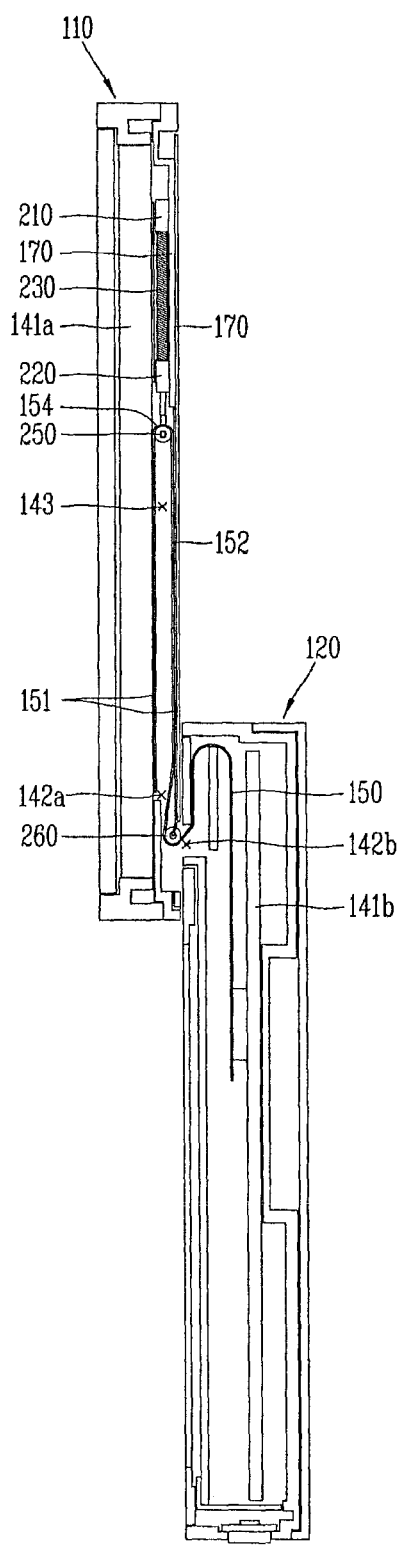
FIG. 8 is a sectional view of the portable terminal, which shows an open configuration.

FIG. 7 is a sectional view of the portable terminal, which shows an intermediate configuration between a closed configuration and an open configuration, and FIG. 8 is a sectional view of the portable terminal, which shows an open configuration.

Hereinafter, a relative motion of the upper body 110 with respect to the lower body 120 will be explained.

Once a user pushes the upper body 110 in a closed configuration, the upper body 110 performs a sliding motion with respect to the lower body 120 as shown in FIG. 7.

Here, the spring 230 provides an elastic force to the second holder 220 in the same direction as a moving direction of the upper body 110. By the elastic force of the spring 230, the first bent portion 154 of the FPCB 150 is moved toward a moving direction of the upper body 110. As a result, a part of the second part 152 of the FPCB 150 is transferred to the accommodation space 143.

During this process, the first and second rolling units 250 and 260 allow the FPCB 150 to be smoothly transferred, and prevent excessive friction from occurring from the first and second bent portions 154 and 155.

If the current configuration of the portable terminal is converted into an open configuration from a closed configuration as shown in FIG. 8, the first bent portion 154 of the FPCB 150 continuously moves to be positioned at the end of the accommodation space 143. Furthermore, most parts of the second part 152 of the FPCB 150 move into the accommodation space 143.

If the current configuration of the portable terminal is converted into a closed configuration from an open configuration, the second holder 220 moves to the original position according to reverse orders to the aforementioned orders, and the second part 252 of the FPCB 150 is transferred to outside of the accommodation space 143.

The mobility of the first bent portion 154 of the FPCB enables a long distance between the first and second openings 142*a* and 142*b*. As the distance between the first and second openings 142*a* and 142*b* becomes far from each other, at least one of the first and second openings 142*a* and 142*b* may not be exposed to outside, even if a relative sliding distance of the upper and lower bodies 110 and 120 in an open configuration, i.e., a stroke is increased. This may increase a relative sliding range of the upper and lower bodies 110 and 120, i.e., a stroke of the upper and lower bodies 110 and 120, without exposing at least one of the first and second openings 142*a* and 142*b* to outside.

In the aforementioned embodiment, the accommodation space 143 configured to accommodate the FPCB 150 therein is formed between the upper body 110 and the slide module 160. However, the slide module 160 is not an absolutely necessary component in the present invention. The upper and lower bodies 110 and 120 may be directly connected to each other without the slide module 160. In this case, the accommodation space 143 is formed in the upper body 110, and the FPCB retention unit 200 is also mounted in the upper body 110.

Figure 9:
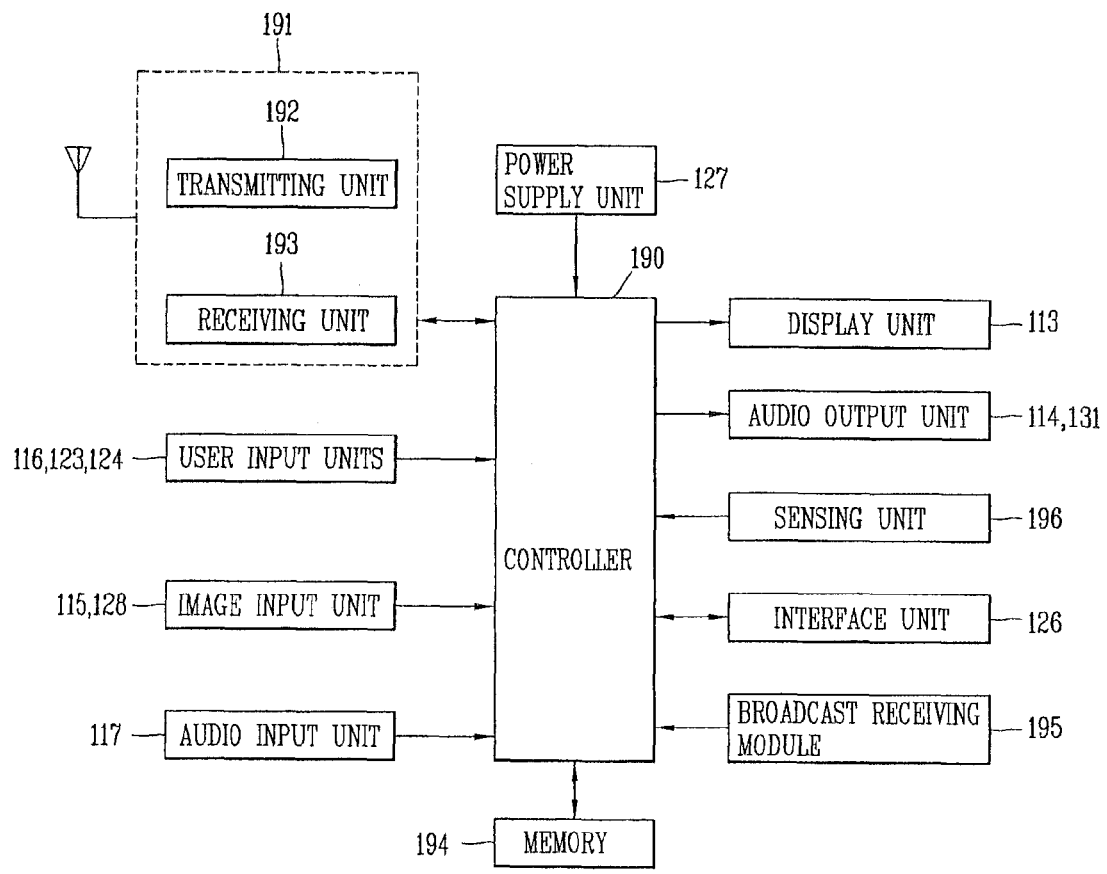
FIG. 9 is a block diagram of the portable terminal according to the present invention.

FIG. 9 is a block diagram of the portable terminal 100 according to one embodiment of the present invention.

Referring to FIG. 9, the portable terminal 100 according to one embodiment of the present invention may comprise a wireless communication module 191, user input units 116, 123 and 124, image input units 115 and 128, an audio input unit 117, a display unit 113, audio output units 114 and 131, a sensing unit 196, an interface unit 126, a broadcast receiving module 195, a memory 194, a power supply unit 127, and a controller 190.

The controller 190 typically controls the overall operations of the portable terminal 100. For example, the controller 190 performs controlling and processing associated with voice calls, data communications, video calls, and the like. In addition, the controller 190 controls functions of the portable terminal 100 relating to the present invention, as well as general functions.

The communication module 191 transmits/receives wireless signals to/from a base station through an antenna. For instance, the wireless communication module 191 transmits/receives voice data, text data, image data, and control data under control of the controller 190. The wireless communication module 191 includes a transmitting unit 192 for transmitting signals after a modulation process, and a receiving unit 192 for demodulating received signals.

The user input units 116, 123 and 124 shown in FIG. 1 provide, to the controller 190, key input data input by a user so as to control the operation of the portable terminal 100.

The image input units 115 and 128 process image frames such as still images or moving images captured by an image sensor in a video-call mode or a capturing mode. Then, the processed image frames are converted to image data that can be displayed on the display unit 113, thereby being output to the display unit 113. Image frames processed by the first and second image input units 115 and 128 are stored in the memory 194 under control of the controller 190, or are transmitted to outside through the wireless communication module 191.

The audio input unit 117 receives an external audio signal through a microphone in a call mode, or a recording mode, or a voice recognition mode, and the like, and then processes the received signal into electric voice data. In the case of a call mode, the processed voice data is converted into data that can be transmitted to the base station through the wireless communication module 191, and then is output to the wireless communication module 191. In the case of a recording mode, the processed voice data is output so as to be stored in the memory 194.

The audio input unit 117 may include assorted noise removing algorithms to remove noise generated in the course of receiving the external audio signal.

The display unit 113 may output information processed in the portable terminal. For example, when the portable terminal 100 operates in a phone call mode, the display unit 113 will provide a User Interface (UI) or a Graphic User Interface (GUI) which includes information associated with the call. As another example, if the portable terminal 100 is in a video call mode or a capturing mode, the display unit 113 may display captured images, or UI or GUI under control of the controller 190. When the display unit 113 includes a touch screen, it may be used as an input device as well as an output device.

In a call mode or a recording mode, a voice recognition mode, a broadcasting signal reception mode, and the like, the audio output units 114 and 131 convert audio data received from the wireless communication module 191, or audio data stored in the memory 194, under control of the controller 190. Then, the audio output units 114 and 131 output the converted data to outside.

The audio output units 114 and 131 output audio signals relating to functions performed in the portable terminal 100, such as sound indicating a call signal reception, or sound indicating a message reception. These audio output units 114 and 131 include a speaker, a receiver, a buzzer, etc.

The sensing unit 196 senses a current status of the portable terminal 100 such as an open/close status of the portable terminal, a position of the portable terminal 100, or whether a user has contacted the portable terminal 100, thereby generating sensing signals to control the operation of the portable terminal 100. For instance, if the portable terminal 100 is a slide phone, the sensing unit 196 senses whether the slide phone has been open or not, and outputs the sensing result to the controller 190, thereby controlling the operation of the portable terminal 100. Furthermore, the sensing unit 196 performs sensing functions relating to whether power has been supplied from the power supply unit 127, or whether the interface unit 126 has been coupled to an external device, and the like.

The interface unit 126 interfaces a wire/wireless headset, an external charger, a wire/wireless data port, a card socket (e.g., memory card, SIM/UIM card), and the like, with any types of external devices connected to the portable terminal 100. The interface unit 126 transmits data or power received from external devices, to each component in the portable terminal, or transmits data in the portable terminal 100 to the external devices.

The memory 194 may store programs to be processed and controlled by the controller 190, or may temporarily store input/output data (e.g., phonebook, messages, still images, moving images, etc.). The memory 194 may store programs to control the operation of the portable terminal 100 according to the present invention. The memory 194 may be implemented using any type of suitable storage medium including a flash memory type, a hard disk type, a multimedia card micro type, a memory card type (e.g., SD or DX memory), Random Access Memory (RAM), Read-Only Memory (ROM), and the like.

The broadcast receiving module 195 receives broadcasting signals transmitted through satellite or terrestrial wave, and then converts them to broadcasting data that can be output to the audio output units 114 and 131 and the display unit 113, thereby outputting the broadcasting data to the controller 190. The broadcast receiving module 195 receives broadcasting-related additional data (e.g., Electric Program Guide: EPG, channel list, and the like). Broadcasting data and additional data converted by the broadcast receiving module 195 may be stored in the memory 194.

The power supply unit 127 receives inner or outer power, and supplies the power to each component of the portable terminal under control of the controller 190.

According to the present invention, when the upper body is in an open configuration, the FPCB between the upper and lower bodies is drawn into the upper body. This may prevent the FPCB from being exposed to outside, and may enhance the appearance.

Furthermore, since the FPCB is effectively covered, a stroke between an open configuration and a closed configuration may be increased.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal, comprising:
 a lower body having a first accommodation space;
 an upper body disposed to overlap the lower body, and formed to be in an open configuration that exposes a part of an upper surface of the lower body, and a closed configuration that covers the part by a sliding motion, and the upper body having a second accommodation space;
 a slide module configured to guide the upper body when the upper body moves to the open configuration or to the closed configuration;
 a flexible printed circuit board (FPCB) having one end accommodated in the first accommodation space and another end accommodated in the second accommodation space, and the FPCB is formed to bend as the upper body moves with respect to the lower body;
 an FPCB retention unit disposed in the second accommodation space of the upper body, and the FPCB retention unit has a first rolling unit connected to the upper body and a second rolling unit formed on the slide module, and the FPCB being roll-contacted to the first rolling unit and to the second rolling unit, and wherein the slide module has a first slide member formed on the upper body, the first slide member covers the lower body in the closed configuration, and the first slide member has a first opening through which the FPCB passes, and wherein the slide module has a second slide member formed on the lower body, the second slide member covers the upper body in the closed configuration, and the second slide member has a second opening through which the FPCB passes, and wherein a distance between the first rolling unit and the second rolling unit is changed in the open configuration or the closed configuration, and wherein when the portable terminal is in the open configuration, the first opening and the second opening face each other, and wherein when the portable terminal is in the closed configuration, the first opening is covered by the second slide module, the second opening is covered by the first slide module, and a part of the FPCB is disposed between the first slide member and the second slide member.

2. The portable terminal of claim 1, wherein the FPCB retention unit comprises:
a first holder fixed to an inner side of the upper body;
a second holder movably mounted to the second accommodation space of the upper body, and the second holder is configured to pull the bent portion; and
a spring supported between the first and second holders, and the spring is configured to restore the second holder to a direction approaching to the first holder when the closed configuration is converted into the open configuration.

3. The portable terminal of claim 1, further comprising a guide unit configured to guide the second holder to linearly move with pulling the bent portion.

4. The portable terminal of claim 3, wherein the guide unit comprises:
a rail formed along a moving direction of the second holder; and
a sliding hanger having one end connected to the second holder, and another end that allows the FPCB to be hung, and the sliding hanger is configured to perform a sliding motion along the rail.

5. The portable terminal of claim 4, wherein the sliding hanger is formed by bending a pin or a rod formed of metallic material.

6. The portable terminal of claim 4, wherein the rail is formed in one pair, and both ends of the sliding hanger are configured to move with contacting the one pair of rails.

7. The portable terminal of claim 4, wherein the sliding hanger comprises the first rolling unit configured to roll-contact the bent portion.

8. The portable terminal of claim 7, wherein the first rolling unit comprises:
a first roller rotatably mounted to the sliding hanger; and
a first revolver formed on an outer circumferential surface of the first roller so as to roll-contact the bent portion of the FPCB.

9. The portable terminal of claim 8, wherein the first revolver is formed of elastomer that can be elastically transformed.

10. The portable terminal of claim 2, wherein the spring is implemented as a tensile coil spring.

11. The portable terminal of claim 1, wherein the FPCB comprises a reverse bent portion bent in an opposite direction to the bent portion, and the reverse bent portion is configured to contact the second rolling unit rotated by being fixed to the upper body.

12. The portable terminal of claim 1, wherein the slide module is configured to guide the upper body when the upper body moves to the open configuration or the closed configuration.

13. The portable terminal of claim 1, wherein the upper body is configured to perform a sliding motion in a width direction.

14. The portable terminal of claim 1, wherein a 'QWERTY' type of key pad is installed at the lower body.

15. A portable terminal, comprising:
a first body that includes a first accommodation space;
a second body to overlap the first body, and formed to be in an open configuration to expose a part of an upper surface of the first body, and a closed configuration to cover the part by a sliding motion, and the second body having a second accommodation space;
a slide module to guide the second body when the second body moves relative to the first body, the slide module having a first slide member and a second slide member;
a flexible printed circuit board (FPCB) having a first end in the first accommodation space and a second end in the second accommodation space, and the FPCB to bend as the second body moves with respect to the first body; and
an FPCB retention unit in the second accommodation space, and the FPCB retention unit includes a first rolling unit coupled to the first body and a second rolling unit on the slide module, and the FPCB roll-contacts the first rolling unit and the second rolling unit,
wherein the slide module includes a first slide member on the second body, the first slide member to cover the first body in the closed configuration, and the first slide member has a first opening, the FPCB to pass through the first opening, and
wherein the slide module includes a second slide member on the first body, the second slide member to cover the second body in the closed configuration, and the second slide member has a second opening, the FPCB to pass through the second opening, and
wherein a distance between the first rolling unit and the second rolling unit changes when the portable terminal moves from the open configuration to the closed configuration, and
wherein when the portable terminal is in the open configuration, the first opening faces the second opening, and
wherein when the portable terminal is in the closed configuration, the first opening is covered by the second slide module, the second opening is covered by the first slide module, and a portion of the FPCB is between the first slide member and the second slide member.

16. The portable terminal of claim 15, wherein the FPCB retention unit comprises:
a first holder coupled to an inner side of the second body;
a second holder movably mounted to the second accommodation space of the second body, and the second holder to pull the bent portion; and
a spring supported between the first and second holders, and the spring to restore the second holder to a direction approaching to the first holder when the portable terminal changes from the closed configuration to the open configuration.

17. The portable terminal of claim 15, further comprising a guide unit to guide the second holder to linearly move by pulling the bent portion.

18. The portable terminal of claim 17, wherein the guide unit comprises:
   a rail along a moving direction of the second holder; and
   a sliding hanger having a first end coupled to the second holder, and a second end to allow the FPCB to be hung, and the sliding hanger to perform a sliding motion along the rail.

* * * * *